US007529772B2

(12) United States Patent
Singh (10) Patent No.: US 7,529,772 B2
(45) Date of Patent: May 5, 2009

(54) METHOD AND SYSTEM FOR ASSOCIATING USER COMMENTS TO A SCENE CAPTURED BY A DIGITAL IMAGING DEVICE

(75) Inventor: Mona Singh, Cary, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 286 days.

(21) Appl. No.: 11/237,148

(22) Filed: Sep. 27, 2005

(65) Prior Publication Data
US 2007/0081090 A1 Apr. 12, 2007

(51) Int. Cl.
G06F 7/00 (2006.01)
G06F 17/00 (2006.01)

(52) U.S. Cl. .................. 707/104.1; 715/728; 715/831; 348/208.14

(58) Field of Classification Search ............... 707/1–10, 707/100–104.1, 200–206; 715/700, 728, 715/773, 831; 348/208.14
See application file for complete search history.

(56) References Cited

U.S. PATENT DOCUMENTS

| | | | |
|---|---|---|---|
| 5,689,742 A | 11/1997 | Chamberlain, IV | |
| 6,041,335 A | 3/2000 | Merritt et al. | |
| 6,208,353 B1 | 3/2001 | Ayer et al. | 345/634 |
| 6,229,566 B1 | 5/2001 | Matsumoto et al. | |
| 6,351,777 B1 | 2/2002 | Simonoff | |
| 6,408,301 B1 | 6/2002 | Patton et al. | |
| 6,629,104 B1 | 9/2003 | Parulski et al. | 707/102 |
| 6,687,878 B1 | 2/2004 | Eintracht et al. | |
| 6,690,883 B2 | 2/2004 | Pelletier | 396/321 |
| 6,721,001 B1 | 4/2004 | Berstis | 348/231.3 |
| 7,043,529 B1 | 5/2006 | Simonoff | |
| 7,171,113 B2 | 1/2007 | Parulski et al. | |
| 2002/0019845 A1 | 2/2002 | Hariton | |
| 2002/0051262 A1 | 5/2002 | Nuttall et al. | |
| 2002/0054112 A1 | 5/2002 | Hasegawa et al. | |
| 2002/0055955 A1 | 5/2002 | Lloyd-Jones et al. | |
| 2002/0141750 A1 | 10/2002 | Ludtke et al. | |
| 2003/0011684 A1 | 1/2003 | Narayanaswami et al. | 348/207.99 |
| 2003/0122942 A1 | 7/2003 | Parker et al. | |
| 2003/0133017 A1 | 7/2003 | Mauro | 348/207.99 |
| 2003/0233379 A1 | 12/2003 | Cohen et al. | |

(Continued)

FOREIGN PATENT DOCUMENTS

JP 2004272490 9/2004

OTHER PUBLICATIONS

Benson et al., Multimedia data management for process control, IEEE, May 15-19, 1994, 332-341.*

(Continued)

*Primary Examiner*—Jean B Fleurantin (57) ABSTRACT

A method for providing user comments relating to a scene captured by an image capture device and a digital imaging device configured to implement the method are described. In one aspect, a scene to be captured is displayed to a user through a display device of the image capture device. The image capture device uses an eye-tracking system to track where the user is gazing as the user views the scene, and detects and collects a user input that comprises user comments. While the user views the scene, a processor in the image capture device associates the user input with a location in the scene corresponding to an area where the user is gazing.

30 Claims, 4 Drawing Sheets

U.S. PATENT DOCUMENTS

| | | | |
|---|---|---|---|
| 2003/0234878 A1 | 12/2003 | Yang | 348/231.4 |
| 2003/0235399 A1 | 12/2003 | Kawahara | |
| 2004/0021780 A1 | 2/2004 | Kogan | 348/231.3 |
| 2004/0041922 A1 | 3/2004 | Norcross | 348/231.4 |
| 2004/0126038 A1 | 7/2004 | Aublant et al. | |
| 2004/0169736 A1 | 9/2004 | Rakvica et al. | 348/222.1 |
| 2004/0201602 A1 | 10/2004 | Mody et al. | |
| 2004/0263661 A1 | 12/2004 | Okisu et al. | |
| 2005/0018057 A1 | 1/2005 | Bronstein et al. | |
| 2005/0091027 A1 | 4/2005 | Zaher et al. | |
| 2005/0104976 A1 | 5/2005 | Currans | 348/231.5 |
| 2005/0128305 A1 | 6/2005 | Hamasaki et al. | 348/207.99 |
| 2006/0001744 A1* | 1/2006 | Singh | 348/207.99 |
| 2006/0005168 A1 | 1/2006 | Singh | |

OTHER PUBLICATIONS

Garcia et al., A distributed real time eye-gaze tracking system, IEEE, vol. 2, Sep. 16-19, 2003, 545-551.*

Bloomsburg University Virtual Training Help Center, "Lesson 14: Selection Tools," [online] Mar. 24, 2003 [retreived on Apr. 28, 2008] Retrieved from the Internet: <URL: http://www.web.archive.org/web/20030324195435/http://lit.bloomu.edu/vthc/Photoshop/BLENDING/selectiontools.htm> 7 pages.

"Eyegaze—a Straight Line to the Future of Computer Technology," LC Technologies, Inc. www.eyegaze.com, 3 pgs, Sep. 27, 2005.

"Quick Glance 2," EyeTech Digital Systems, www.eyetechds.com, 2 pgs, Sep. 27, 2005.

"Communication by Gaze Inteaction," Cogain Communication by Gaze Interaction, www.cogain.org, 3 pgs, Sep. 27, 2005.

Edwards, Gregory, A Tool for Creating Eye-Aware Applications that Adapt to Changes in User Behavior, Proceedings of Assets 98, Marina del Rey, California, Apr. 1998, pp. 1-11.

Shaviv, Bernard D., "The Design and Improvement of an Eye Controlled Interface," Eye Tracking-Report: The Design and Improvement of an Eye Controller, www.cs.sunysb.edu, pp. 1-11, Sep. 27, 2005.

Van Cleyenbreugel, J., et al., "Annotating Radiological Images for Computer Assisted Communication and Teaching," Computer Communications, Elsevier Science Publishers BV, Amsterdam, NL, vol. 19, No. 6, Jun. 1996, pp. 498-508, XP004052736 ISSN: 0140-3664.

"Implementation of Image Annotation," IBM Technical Disclosure Bulletin, IBM Corp., New York, US, vol. 39, No. 2, Feb. 1996, pp. 25-26, XP000559805 ISSN: 0018-8689.

"CoffeeCup WebCam—Capturing/Viewing Images," [online] Jun. 12, 2004, CoffeeCup [retrieved May 14, 2007] Retrieved from the Internet: <URL: http://web.archive.org/web/20040612224337/www.coffeecup.com/help/webcam/capturingviewing-images.17-075.html> 2 pages.

* cited by examiner (Prior Art)

METHOD AND SYSTEM FOR ASSOCIATING USER COMMENTS TO A SCENE CAPTURED BY A DIGITAL IMAGING DEVICE

RELATED APPLICATIONS

The present application is related to U.S. patent application Ser. No. 10/884,395 entitled "METHOD AND SYSTEM FOR MORE PRECISELY LINKING METADATA AND DIGITAL IMAGES," filed on Jul. 2, 2004, assigned to the assignee of the present application, and incorporated here by reference in its entirety.

TECHNICAL FIELD

The present invention relates to digital imaging devices and more particularly to a method and system for associating user comments to a scene captured by such devices.

BACKGROUND

Figure 1:
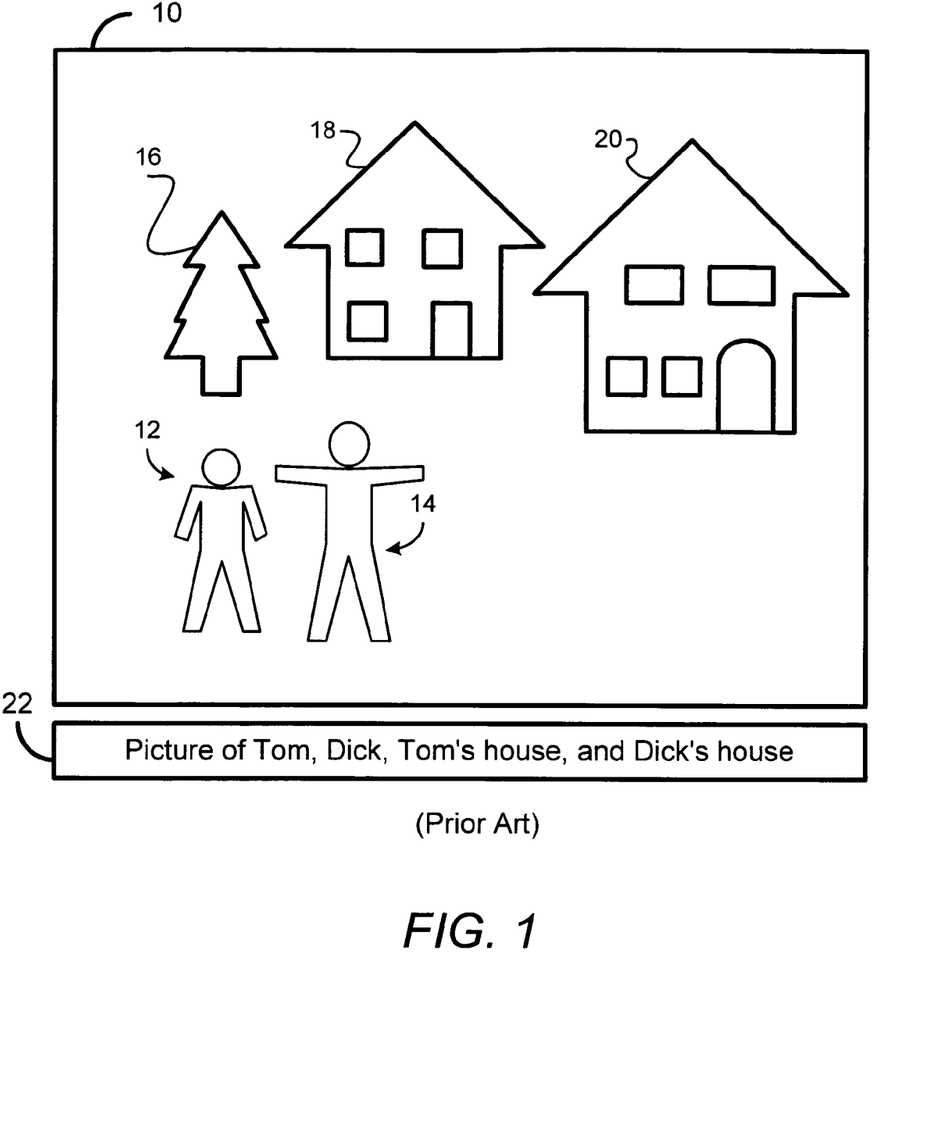
FIG. 1 is a diagram of a standard digital image.

FIG. 1 depicts a conventional image 10. Images are typically made up of elements. In the conventional image 10 shown, the elements include people 12 and 14, tree 16, and buildings 18 and 20. Other conventional images may include other and/or different elements. The conventional image 10 may be captured by an image capture device, such as a digital camera. In addition, the conventional image 10 is a digital image that is represented in digital form.

Often, metadata is associated with a conventional image. Such metadata may include sound, text, or other metadata describing the image. For example, in the conventional image 10, the user may wish to identify the people 12 and 14, the buildings 18 and 20, or the type of tree 16. In order to do so, the user may enter this information, for example in a text format. The metadata 22 is then associated with the conventional image 10. When the conventional image 10 is viewed, the metadata 22 associated with the image is provided. For example, the metadata 22 may be printed as text below the conventional image 10 as shown in FIG. 1.

Although the conventional image 10 and the associated metadata 22 allow the user to more fully describe the elements 12, 14, 16, 18, and 20 or other aspects of the image, one of ordinary skill in the art will readily recognize that there are limitations to the metadata 22. In particular, the metadata 22 may not adequately describe the conventional image 10. For example, in FIG. 1, the conventional metadata identifies the individuals 12 and 14 (Tom and Dick), as well as the buildings 18 and 20 (Tom's house and Dick's house) in the conventional image 10. However, a viewer who does not know Tom or Dick may be unable to identify the individuals solely on the basis of the metadata 22 provided.

Further, even if the viewer does know the people 12 and 14, the viewer may be unable to tell which house is Tom's or Dick's based upon the metadata 22. The user who entered the metadata may be able to provide more specific metadata (e.g. Tom is on the left and Dick is on the right). However, this places a greater burden on the user and requires the user to more carefully choose the terms used in the metadata 22. Further, there may be limitations to the amount of text that can be provided in the metadata 22. As such, the user may not be able to sufficiently describe the elements 12, 14, 16, 18, and 20, or the entire image.

In co-pending U.S. patent application Ser. No. 10/884,395 entitled "METHOD AND SYSTEM FOR MORE PRECISELY LINKING METADATA AND DIGITAL IMAGES," filed on Jul. 2, 2004, and assigned to the assignee of the present invention, a method and system is described that allows metadata to be associated with a selected portion of an image. A user is allowed to select a portion of the image, such as an individual 12, 14 or a building 18, 20, using a graphical element. In one aspect, the user controls the graphical element by pressing navigation buttons of an image capture device to increase or decrease the size of the graphical element and to move the graphical element through portions of the image. Once the user selects the portion of the image with which metadata will be associated, the user enters the metadata by pressing keys on a keypad, by writing with a stylus, or by recording sounds. The metadata is then automatically associated with the portion of the image defined using the graphical element.

While the above-described invention is well-suited for associating metadata with certain elements in the image, some users are simply not inclined to provide metadata because, for example, they might be too busy or they might be technologically challenged. Moreover, even if the user is inclined to provide metadata, important facts, such as names of individuals and places, can be forgotten between the time of image capture and the time of metadata entry.

SUMMARY

A method for providing user comments relating to a scene captured by an image capture device and a digital imaging device configured to implement the method are described. In one aspect, a scene to be captured is displayed to a user through a display device of the image capture device. The image capture device uses an eye-tracking system to track where the user is gazing as the user views the scene, and detects and collects a user input that comprises user comments. While the user views the scene, a processor in the image capture device associates the user input with a location in the scene corresponding to an area where the user is gazing.

BRIEF DESCRIPTION OF SEVERAL VIEWS OF THE DRAWINGS

The various features of the present invention and the manner of attaining them will be described in greater detail with reference to the following description, claims and drawings, wherein reference numerals are reused, where appropriate, to indicate a correspondence between the referenced items, and wherein:

DETAILED DESCRIPTION

The present invention relates to digital imaging devices and more particularly to a method and system for associating user comments to a scene prior to its capture by such a device. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

According to one embodiment, an eye-gaze or eye-tracking system is integrated into a digital imaging device. The imaging device displays to a user a live view image or scene to be captured and uses the eye-tracking system to track where the user is gazing while viewing the scene. The user is allowed to input comments as the user gazes from one location in the scene to another, and the digital imaging device automatically associates the comments with each location in the scene based on the eye-tracking data. These and other features will be described in greater detail below with reference to the drawings.

Figure 2:
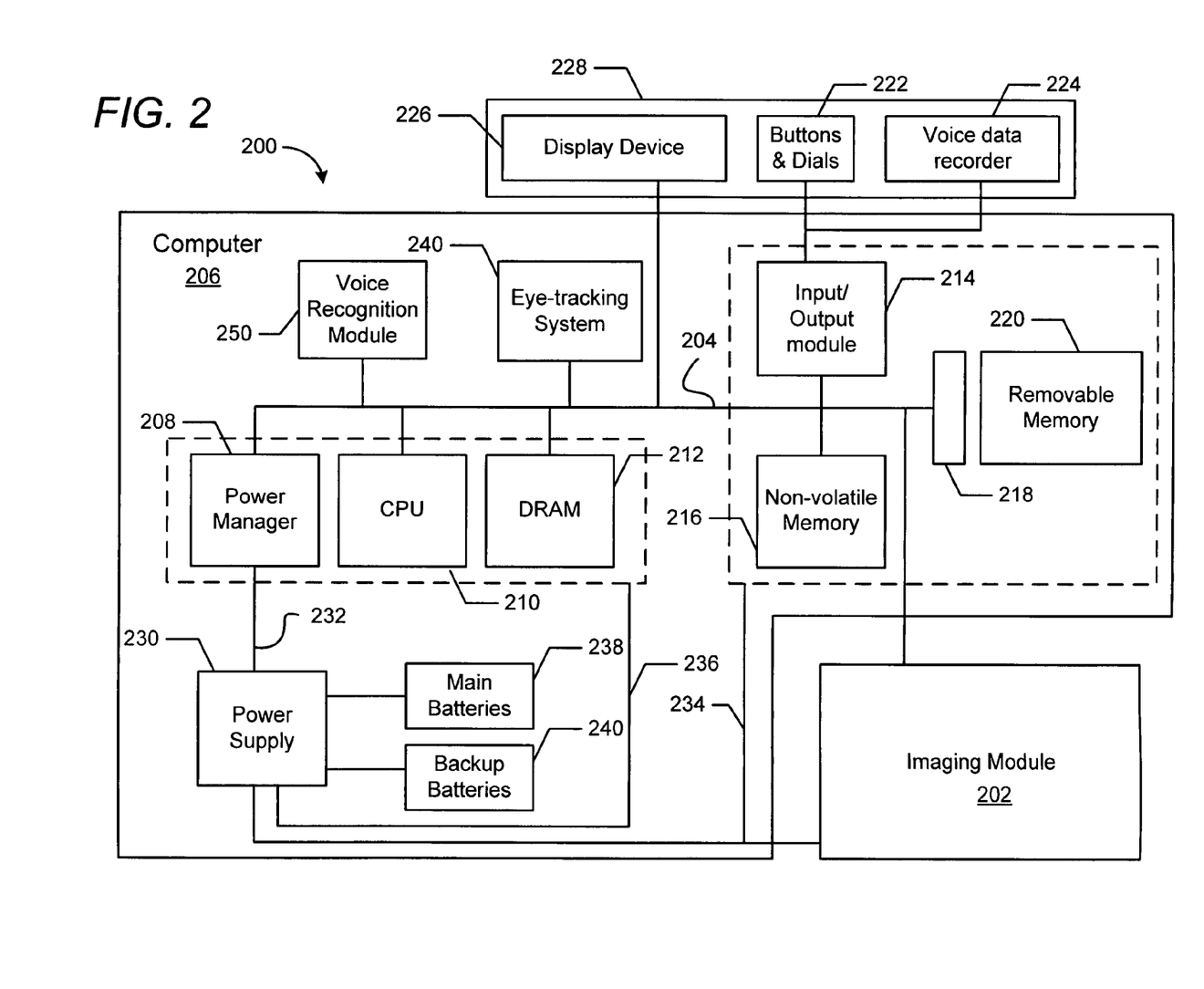
FIG. 2 is a block diagram of a digital imaging device that operates in accordance with an exemplary embodiment.

FIG. 2 is a block diagram of one embodiment of a digital imaging device 200 for use in accordance with an exemplary embodiment. In this embodiment, the digital imaging device 200 can be a digital camera, a camera phone, a digital camcorder, or the like. The device 200 preferably comprises an imaging module 202, a system bus 204 and a computer 206. Imaging module 202 includes an image sensor, such as a charged coupled device (CCD) or a CMOS sensor, for generating a set of raw image data representing a captured image. In a preferred embodiment, system bus 204 provides connection paths between imaging module 202, an optional power manager 208, central processing unit (CPU) 210, dynamic random-access memory (DRAM) 212, input/output module (I/O) 214, non-volatile memory 216, and buffers/connector 218 that connect an optional removable memory 220 to system bus 204.

CPU 210 may include a conventional microprocessor device for controlling the operation of digital imaging device 200. In the preferred embodiment, CPU 210 is capable of concurrently running multiple software routines to control the various processes of device 200 within a multithreaded environment. For example, images may be captured at the same time that previously captured images are processed in the background to effectively increase the capture rate of the camera. In a preferred embodiment, CPU 210 runs an operating system that includes a menu-driven GUI and provides image processing through software, rather than hardware. Although CPU 210 is preferably a microprocessor, one or more DSP's (digital signal processor) or ASIC's (Application Specific Integrated Circuit) could also be used.

I/O module 214 is an interface device allowing communications to and from computer 206. For example, I/O 214 permits an external host computer (not shown) to connect to and communicate with computer 206. I/O 214 also interfaces with a plurality of buttons and/or dials 222, and in one embodiment a voice data recorder 224, which in addition to the display device 226, are the hardware elements of the device's user interface 228.

Non-volatile memory 216, which may typically comprise a conventional read-only memory or flash memory, stores a set of computer-readable program instructions to control the operation of device 200. Removable memory 220 serves as an additional image data storage area and is preferably a non-volatile device, such a flash disk, readily removable and replaceable by a device 200 user via buffers/connector 218.

Power supply 230 supplies operating power to the various components of device 200. Power manager 208 communicates via line 232 with power supply 230 and coordinates power management operations for device 200. In the preferred embodiment, power supply 230 provides operating power to a main power bus 234 and also to a secondary power bus 236. The main power bus 234 provides power to imaging module 202, I/O 214, non-volatile memory 216 and removable memory 220. The secondary power bus 236 provides power to power manager 208, CPU 210 and DRAM 212.

Power supply 230 is connected to main batteries 238 and also to backup batteries 240. In the preferred embodiment, the device 200 user may also connect power supply 230 to an external power source. During normal operation of power supply 230, the main batteries 238 provide operating power to power supply 230 which then provides the operating power to device 200 via both main power bus 234 and secondary power bus 236. During a power failure mode in which the main batteries 238 have failed (when their output voltage has fallen below a minimum operational voltage level) the backup batteries 240 provide operating power to power supply 230 which then provides the operating power only to the secondary power bus 236 of device 200.

Dynamic Random-Access-Memory (DRAM) 212 is a contiguous block of dynamic memory that may be selectively allocated for various storage functions. DRAM 212 stores both raw and compressed image data and is also used by CPU 210 while executing the software routines used within computer 206. The raw image data received from imaging module 202 is temporarily stored in several input buffers (not shown) within DRAM 212. Once the raw image data is processed, it is stored in a frame buffer (not shown) for display on the display device 226. In a preferred embodiment, the input buffers and the frame buffer are split into two ping-pong buffers to improve the display speed of the digital camera and to prevent the tearing of the image in the display 226. After processed image data has been stored in DRAM 212, the image data is transferred to the display device 226 for display.

According to a preferred embodiment, the digital imaging device 200 includes an eye-tracking system 240 and a voice recognition module 250, both in communication with the imaging module 202, CPU 210, DRAM 212, I/O module 214 and non-volatile 216 and removable 220 memory via the system bus 204. The eye-tracking system 240 tracks and records the movement of a user's eye(s) to determine a location where the user is gazing. The eye-tracking system 240 can use many different known techniques to monitor and track the user's eye movements. For example, the eye-tracking system 240 can utilize a technique known as corneal reflection, which directs an infrared light beam at the user's eye and measures the angular difference between the operator's mobile pupil and the stationary light beam reflection. Alternatively, the eye-tracking system 240 can scan the user's eye region with a scanning apparatus, e.g., television camera, and analyze the resulting image. Eye-tracking systems 240 that can be appropriate for use with the embodiments described here are currently implemented in commercially available digital imaging devices for providing eye-controlled focus control, such as the EOS ELAN 7/7e and the EOS 55, both digital cameras manufactured by Canon Inc., of Tokyo, Japan.

The voice recognition module 250 receives voice data from the voice data recorder 224 while the user views the scene using display device 226, and translates the voice data into text data. The translation process can be performed on-the-fly, i.e., as the voice data is recorded, or at a later time. Commercially available voice recognition 250 packages include, for example, DRAGON NATURALLY SPEAKING developed by ScanSoft, Inc. of Burlington, Mass., or the VIAVOICE product developed by International Business Machines, Incorporated of Armonk, N.Y.

Figure 3:
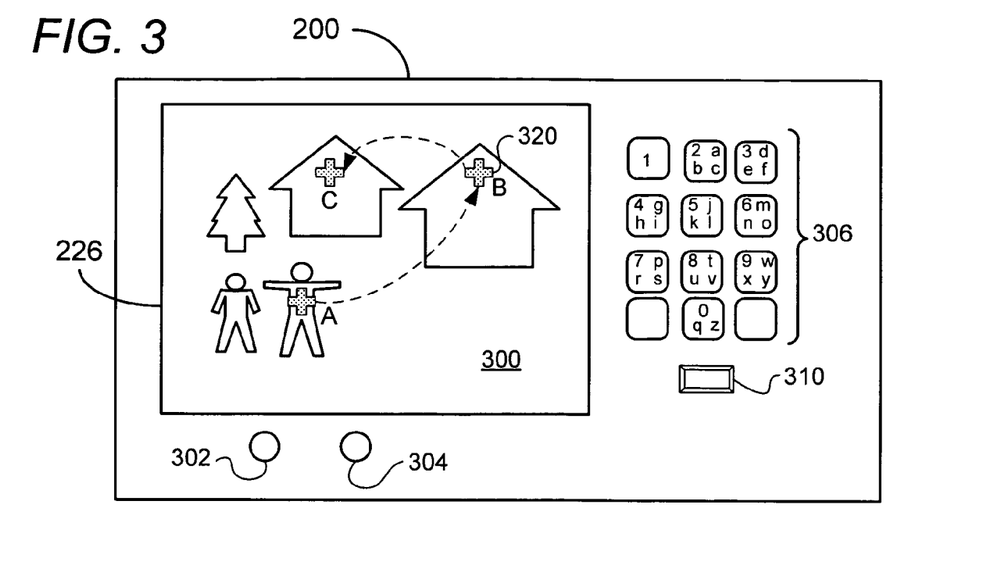
FIG. 3 is a back view of the digital imaging device of FIG. 2 according to one embodiment.

FIG. 3 is a back view of the digital imaging device 200 showing the display device 226, an eye-tracking sensor 302, a microphone 304, a keypad 306, and an activation button 310. A scene 300 to be captured is displayed by the display device 226. As the user (not shown) looks at the scene 300, her gaze moves from point A to point B to point C. The eye-tracking sensor 302 tracks the user's eye movement and directs a marker 320 in the display device 226 to follow the user's gaze from point A to point C. In one embodiment, the user can increase or decrease the size of the marker 320 in order to pin-point more precisely the area to which comments will be associated. In another embodiment, the user can zoom in or out of the scene in order to decrease or increase a fraction of the scene 300 with which comments can be associated. The microphone 304 is coupled to the voice data recorder 224 (FIG. 2) and listens for voice data. The keypad 306 allows the user to enter text or numbers by pressing on an appropriate key.

Figure 4:
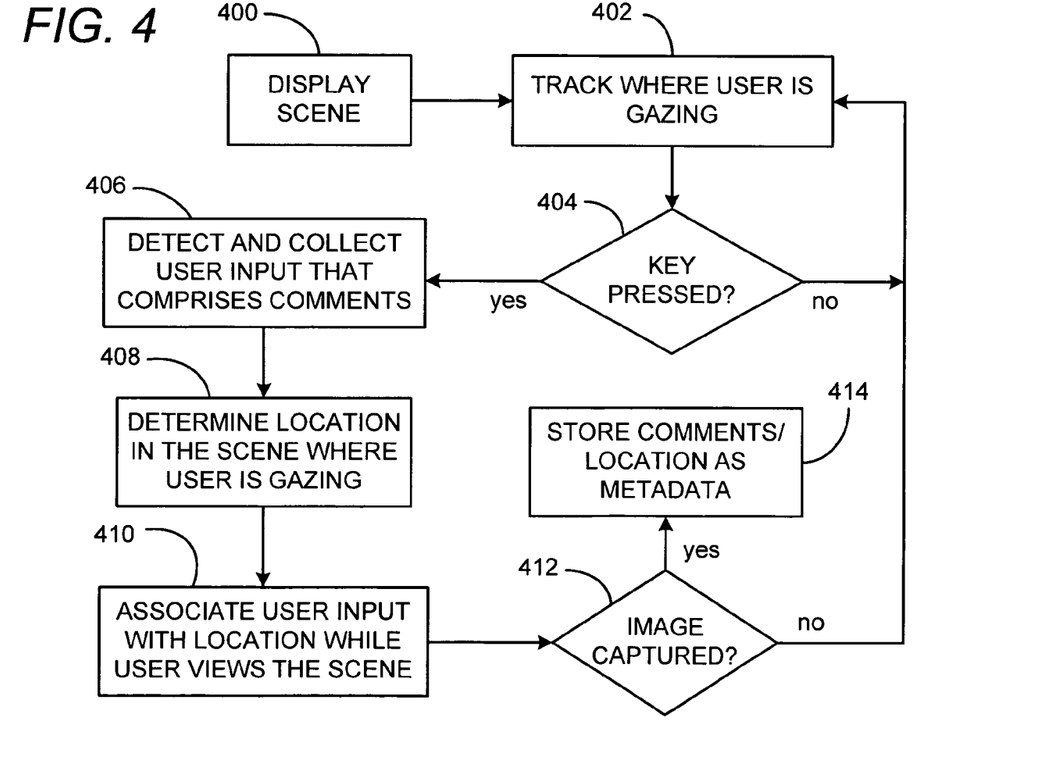
FIG. 4 is a flowchart illustrating a process for providing comments relating to a scene according to one embodiment.

FIG. 4 is a flowchart illustrating a process for providing comments relating to a scene according to one embodiment. Referring to FIG. 2, FIG. 3 and FIG. 4, the process begins by displaying the scene 300 to the user via the display device 226 (step 400). The display device 226 can be an LCD screen or a viewfinder of a camera. At this time, the user is framing the shot, i.e., composing an image that will be captured by the digital imaging device 200. The eye-tracking system 240 tracks where the user is gazing as the user views the scene 200 via the eye-tracking sensor 302 (step 402). The marker 320 on the display device 226 indicates to the user that the digital imaging device 200 is following the user's gaze. In one embodiment, the eye-tracking system 240 continuously tracks the user's gaze, while in another embodiment, the user can activate the eye-tracking system 240 when the user wishes to provide comments relating to the scene 300 to be captured.

When the user wishes to provide comments related to an element of the scene 300, the user gazes at the element, e.g., point A, can press the activation button 310 (step 404), and, in one embodiment, speaks. The microphone 304 detects and collects the user's comments as voice data (step 406) and passes the voice data to the voice data recorder 224 (FIG. 2). Alternatively, the voice data recorder 224 can be activated by the detection of the voice data, e.g., voice activated, and the user need not press the activation button 310.

In another embodiment, the user can provide comments using the keypad 306. In this embodiment, when the user presses the activation button 310 (step 404), the location of the marker 320 is locked. This then allows the user to look at the keypad 306 in order to enter the desired text comments.

While the comments are being collected, the CPU 210 determines a location, e.g., point A, in the scene corresponding to an area where the user is gazing (step 408) based on eye-tracking data collected by the eye-tracking system 240. In one embodiment, the eye-tracking data includes at least one set of (x, y) coordinates corresponding to the location of the marker 320 during user input. If the user moves or shakes the digital imaging device 200 while the comments are being collected, existing image stabilization techniques, such as the use of floating optical elements or gyro sensors, can be utilized to minimize confusion as to the location corresponding to the area where the user is gazing. If such confusion cannot be resolved, e.g., because the movement exceeds a predetermined amount, the commenting process can be terminated and an error message can be displayed to the user.

When the user is done providing comments, the CPU 210 automatically associates the comments with the location in the scene 300 (step 410). If the user's gaze moves from a first location, e.g., point A, to a second location, e.g., point B, while the user is providing comments, the CPU 210 can associate the comments with a combination of the first and second locations provided that the first and second locations are within a predetermined distance from one another.

After the comments have been associated with the location(s), the user can continue viewing the scene 300 and providing comments to other elements in the scene 300, i.e., repeating steps 402 to 410. Alternatively, the user can capture an image of the scene 300 (step 412) by pressing a shutter button (not shown). In one embodiment, the digital imaging device 200 automatically identifies locations associated with comments as areas of particular interest to the user. As such, the digital imaging device 200 can automatically control certain functions, such as auto focus, color balance, auto exposure, on at least one of the locations in the scene 300 with which the user has associated comments.

Once the image is captured, the CPU 210 stores the comments and associated location(s) as metadata for the captured image (step 414). In one embodiment, the user comments comprising voice data can be stored as an audio clip that can be played back to the user. In another embodiment, the voice data is translated to text data by the voice recognition module 250 and the text data is associated with the location(s) and stored as metadata. The metadata and image data associated with the captured image is typically stored in DRAM 212 or removable memory 220.

The metadata can be used in various ways. For example, the metadata for an image can be used to index the image in a library. A user can perform a search of the library based on the metadata to find images that include metadata that satisfy the search criteria. For example, if the user wants to find images that include a certain individual or a certain city, the user can enter a search criteria including the individual's name or the name of a city.

Figure 5A:
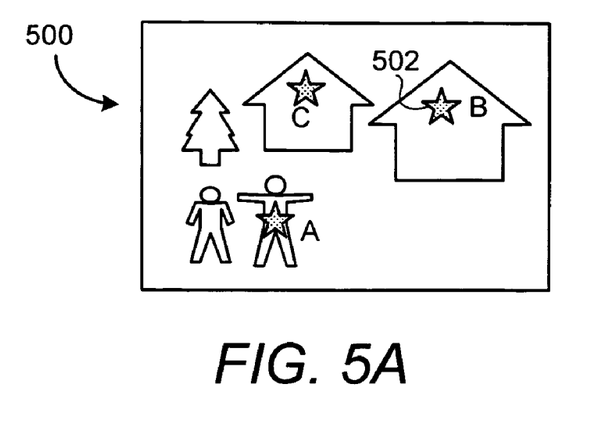
FIGS. 5A-5C are views of an image having comments associated with locations in the image according to one embodiment.

The metadata can be also be used to inform a viewer of the contents or context of an image when the image is displayed on the display device 226 of the digital imaging device 200 or on a display screen of another computing system, e.g., a desktop computer. In one embodiment, illustrated in FIG. 5A, the image 500 includes at least one indication 502 at a location that signifies that comments are associated with the location. In the embodiment shown in FIG. 5, the indication is a star 502. The indication 502, however, can be of any form. For example, the location can be highlighted, or shaded, or otherwise differently pixilated in order to inform the viewer of the existence of associated comments.

In one embodiment, as the viewer scans the image 500, the eye-tracking system 240 (FIG. 2) tracks the viewer's gaze. When the viewer's gaze stays on an indicator 502, e.g., point A, for a predetermined time period, i.e., the viewer's gaze dwells on the indicator 502, the comments associated with that location can be presented. The viewer can also select an indicator 502 by moving a cursor over the indicator 502 via navigation buttons or a mouse or any other suitable user input device.

Figure 5B:
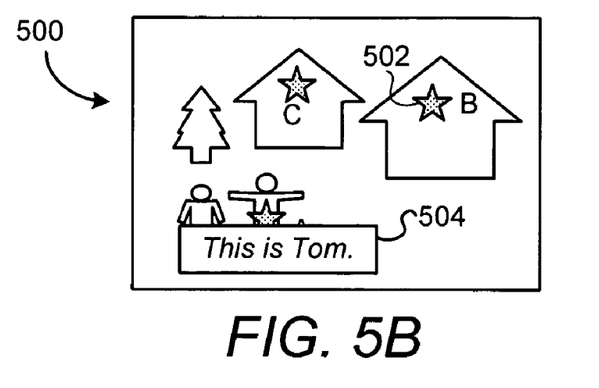

In one embodiment, illustrated in FIG. 5B, the comments are presented as text in a text box 504. In another embodiment, the audio clip can be played. Other types of presentation can be suitable for other types of comments.

Figure 5C:
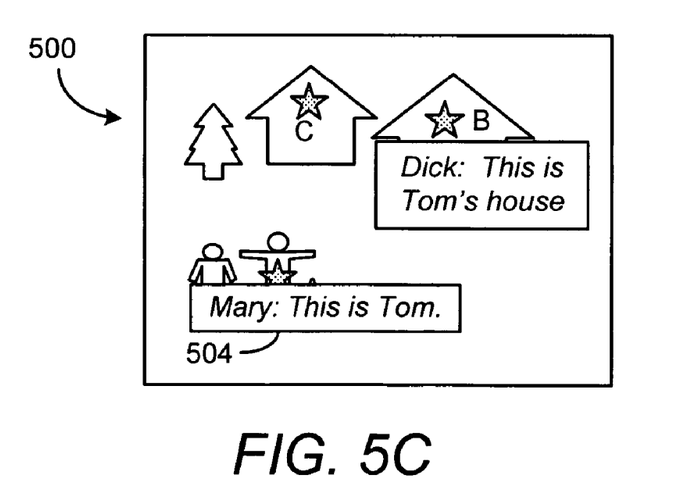

When viewing the image 500, the viewer can add comments to a location in the image 500 in the same manner as described in FIG. 4. That is, the viewer can gaze at a specific location in the image 500, press the activation button 310 (FIG. 3), and begin speaking or entering text. The viewer's comments are collected and associated with the location and stored as additional metadata of the image 500. Subsequently when the image 500 is displayed to another viewer, the displayed comments can be identified by their respective creators, as illustrated in FIG. 5C.

In another embodiment, the viewer can modify a comment associated with a location in the image 500, e.g., to correct the information. Preferably, the digital imaging device 200 includes means for determining whether the viewer is authorized to make such modifications. For example, the viewer can be asked to enter a username or user ID before the viewer is allowed to modify the comment. Such means are well known in the art and commercially available. Once authorized, the viewer can modify the comment in the manner described in FIG. 4, and the modified comment can replace the previous comment and be stored as metadata for the image 500.

The techniques described here allow the user to associate more easily precise comments with particular elements of a scene prior to capturing the image of the scene. Instead of pressing navigation buttons to move a cursor, a user can pinpoint an element merely by focusing her or his gaze at the element. Thus, if the user is composing a picture that includes several individuals, the user can provide comments identifying each individual by looking at each individual and speaking his or her name. If needed, the user can zoom-in on a particular element and provide further detailed comments.

Using gaze-technology and optionally voice data technology, the process of providing comments relating to elements in a scene is more intuitive and efficient. Thus, the user will be more inclined to provide comments. In addition, because the comments can be provided as the user is viewing the scene, as opposed to days or weeks after the image is captured, the comments can be more accurate and comprehensive. For example, if the user does not know the name of a particular individual, the user can determine the individual's name as the picture is being composed, e.g., by asking the individual or others, and then associate the name with the individual.

The present invention has been described in accordance with the embodiments shown, and one of ordinary skill in the art will readily recognize that there could be variations to the embodiments, and any variations would be within the spirit and scope of the present invention. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Accordingly, many modifications may be made by one of ordinary skill in the art without departing from the spirit and scope of the appended claims.

I claim:

1. A method for providing comments relating to a scene captured by an image capture device, the method comprising: displaying a scene to be captured to a user through a display device of the image capture device; tracking where the user is gazing as the user views the scene; detecting and collecting a user input that comprises user comments; and associating the user input with a location in the scene corresponding to an area where the user is gazing while the user views the scene.

2. The method according to claim 1 further comprising repeatedly tracking, detecting, collecting and associating until the user captures the scene using the image capture device.

3. The method according to claim 1 wherein detecting and collecting the user input comprises: recording voice data.

4. The method according to claim 3 further comprising: providing a voice recognition module in the image capture device; and using the voice recognition module to translate the voice data into text data, wherein associating the user input includes associating at least one of the voice data and the text data with the location in the scene.

5. The method according to claim 1 wherein detecting and collecting the user input comprises providing in the image capture device a keypad having a plurality of keys for text entry and sensing an activation of at least one of the plurality of keys.

6. The method according to claim 1 further comprising: after an image of the scene is captured by the image capture device, storing the location in the scene and the associated user comments as metadata for the captured image.

7. The method according to claim 6 further comprising: displaying the captured image to the user; tracking the user's gaze as the user views the captured image; and presenting the user comments associated with the location in the image when the user's gaze dwells on the location.

8. The method according to claim 6 further comprising: allowing the user to review and modify the user comments; and storing the modified user comments as metadata for the captured image.

9. The method of claim 1 wherein tracking the direction of the user's gaze includes: providing a marker in the display device corresponding to the location where the user is gazing; and moving the marker as the user's gaze moves.

10. The method of claim 1 further comprising zooming-in on a portion of the scene where the user is gazing so that the user comments are more precisely associated with a particular location in the scene.

11. The method of claim 1, wherein the user input comprising the user comments is associated with the location in the scene at the time the user input is detected.

12. The method of claim 11, wherein if the user's gaze moves a predetermined amount while detecting the user input, the method further comprises associating the user input with a combination of locations upon which the user's gaze was tracked while detecting the user input.

13. A digital imaging device comprising: a display device for displaying a scene to be captured to a user; an eye-tracking system for tracking where a user is gazing as the user views the scene through the display device; a user input module stored on the digital imaging device for detecting and collecting user comments; and a processor for associating the user input with a location in the scene corresponding to an area where the user is gazing while the user views the scene.

14. The digital imaging device of claim 13 wherein the user input module comprises a voice data recorder.

15. The digital imaging device of claim 14 further comprising a voice recognition module that translates the voice data into text data.

16. The digital imaging device of claim 15 wherein the processor associates at least one of the voice data and the text data with the location in the scene.

17. The digital imaging device of claim 13 wherein the user input module comprises a keypad having a plurality of keys for text entry and a means for sensing an activation of at least one of the plurality of keys.

18. The digital imaging device of claim 13 further comprising: an imaging module for capturing an image of the scene; and a storage mechanism for storing the location in the scene and the associated user input as metadata for the captured image.

19. The digital imaging device of claim 18 wherein the display device displays the captured image to the user and, as the user is viewing the captured image, the display device displays the user comments associated with the location in the scene when the user's gaze dwells on the location.

20. The digital imaging device of claim 13, wherein the processor is configured to associate the user input comprising the user comments with the location in the scene at the time the user input is detected.

21. The digital imaging device of claim 20, wherein if the user's gaze moves a predetermined amount while detecting the user input, the processor is further configured to associate the user input with a combination of locations upon which the user s gaze was tracked while detecting the user input.

22. A computer readable storage medium containing a computer program for providing comments relating to a scene captured by an image capture device, the computer program comprising executable instructions for: displaying a scene to be captured to a user through a display device of the image capture device; tracking where the user is gazing as the user views the scene; detecting and collecting a user input that comprises user comments; and associating the user input with a location in the scene corresponding to an area where the user is gazing while the user views the scene.

23. The computer readable storage medium according to claim 22 further comprising executable instructions for repeatedly tracking, detecting, collecting and associating until the user captures the scene using the image capture device.

24. The computer readable storage medium according to claim 22 wherein the executable instructions for detecting and collecting the user input comprise executable instructions for: recording voice data.

25. The computer readable storage medium according to claim 24 further comprising executable instructions for: using a voice recognition module to translate the voice data into text data, wherein associating the user input includes associating at least one of the voice data and the text data with the location in the scene.

26. The computer readable storage medium according to claim 22 further comprising instructions for: storing the location in the scene and the associated user comments as metadata for the captured image after an image of the scene is captured by the image capture device.

27. The computer readable storage medium according to claim 26 further comprising instructions for: displaying the captured image to the user; tracking the user's gaze as the user views the captured image; and presenting the user comments associated with the location in the image when the user's gaze dwells on the location.

28. The computer readable storage medium according to claim 26 further comprising instruction for: allowing the user to review and modify the user comments; and storing the modified user comments as metadata for the captured image.

29. The computer readable storage medium of claim 22 further comprising instructions for zooming-in on a portion of the scene where the user is gazing so that the user comments are more precisely associated with a particular location in the scene.

30. The computer readable storage medium of claim 22, wherein if the user's gaze moves a predetermined amount while detecting the user input, the computer readable medium further comprises instructions for associating the user input with a combination of locations upon which the user's gaze was tracked while detecting the user input.

* * * * *